US010506268B2

(12) United States Patent
Pompa et al.

(10) Patent No.: US 10,506,268 B2
(45) Date of Patent: Dec. 10, 2019

(54) IDENTIFYING MEDIA CONTENT FOR SIMULTANEOUS PLAYBACK

(71) Applicant: SPOTIFY AB, Stockholm (SE)

(72) Inventors: Ronald Pompa, Stockholm (SE); Jonas Vis, Stockholm (SE); Johan Simonsson, Stockholm (SE)

(73) Assignee: SPOTIFY AB, Stockholm (SE)

( * ) Notice: Subject to any disclaimer, the term of this patent is extended or adjusted under 35 U.S.C. 154(b) by 39 days.

(21) Appl. No.: 15/783,700

(22) Filed: Oct. 13, 2017

(65) Prior Publication Data

US 2018/0109820 A1 Apr. 19, 2018

Related U.S. Application Data

(60) Provisional application No. 62/408,692, filed on Oct. 14, 2016.

(51) Int. Cl.
*H04N 21/2387* (2011.01)
*A63F 13/25* (2014.01)
(Continued)

(52) U.S. Cl.
CPC ......... *H04N 21/2387* (2013.01); *A63F 13/25* (2014.09); *A63F 13/30* (2014.09);
(Continued)

(58) Field of Classification Search
CPC ........... H04N 21/2387; H04N 21/4825; H04N 21/26258; H04N 21/4622; H04N 21/8586;
(Continued)

(56) References Cited

U.S. PATENT DOCUMENTS

| 7,991,792 B2 * | 8/2011 | Rothschild | ........ G06F 17/30265 707/791 |
| 8,051,453 B2 * | 11/2011 | Arseneau | .............. G06F 1/1626 725/94 |

(Continued)

FOREIGN PATENT DOCUMENTS

WO 2005/036875 A1 4/2005

OTHER PUBLICATIONS

Extended European Search Report from European Application No. 17196357.2, dated Dec. 6, 2017.

*Primary Examiner* — Hai V Tran
(74) *Attorney, Agent, or Firm* — Merchant & Gould P.C.

(57) ABSTRACT

Systems, devices, and methods for identifying and providing media content to a media-playback device for playback with simultaneous media content are provided. An example system and method for providing media content to a media-playback device for playback with simultaneous media content receives at a computing device a request for media content from a media-playback device, the request including an identification of simultaneous content to be played on the media-playback device. The system and method extracts the identification of the simultaneous content from the request using the computing device. The system and method identifies media content based on the extracted identification of the simultaneous content and transmits data relating to the media content to the media-playback device. Some examples identify media content using indirect qualities.

27 Claims, 3 Drawing Sheets

(51) Int. Cl.
*A63F 13/30* (2014.01)
*A63F 13/73* (2014.01)
*G06F 3/0482* (2013.01)
*H04N 21/262* (2011.01)
*H04N 21/472* (2011.01)
*H04N 21/478* (2011.01)
*H04N 21/643* (2011.01)
*H04N 21/858* (2011.01)
*H04N 21/462* (2011.01)
*H04N 21/482* (2011.01)

(52) U.S. Cl.
CPC ............ *A63F 13/73* (2014.09); *G06F 3/0482* (2013.01); *H04N 21/26258* (2013.01); *H04N 21/4622* (2013.01); *H04N 21/4781* (2013.01); *H04N 21/47217* (2013.01); *H04N 21/4825* (2013.01); *H04N 21/643* (2013.01); *H04N 21/8586* (2013.01)

(58) Field of Classification Search
CPC ......... H04N 21/47217; H04N 21/4781; H04N 21/643; A63F 13/30; A63F 13/73; A63F 13/25; G06F 3/0482
See application file for complete search history.

(56) References Cited

U.S. PATENT DOCUMENTS

| | | | | |
|---|---|---|---|---|
| 8,176,124 B2* | 5/2012 | Graham | ................ | A63F 13/35 463/42 |
| 8,337,305 B2* | 12/2012 | Aronzon | ................ | G06F 9/454 463/36 |
| 8,868,564 B1* | 10/2014 | Ogilvie | ............ | G06F 17/30595 707/740 |
| 9,245,583 B2* | 1/2016 | Bhogal | ................ | G11B 27/10 |
| 2004/0158860 A1* | 8/2004 | Crow | ................ | H04N 7/17318 725/46 |
| 2006/0068919 A1* | 3/2006 | Gottfurcht | .............. | G07F 17/32 463/42 |
| 2006/0282612 A1* | 12/2006 | Ikeda | ................ | G11B 20/10 711/111 |
| 2006/0287099 A1* | 12/2006 | Shaw | .................... | A63F 13/12 463/42 |
| 2007/0124491 A1* | 5/2007 | Hawkins | ........... | G06Q 30/0209 709/231 |
| 2007/0265094 A1* | 11/2007 | Tone | ....................... | G07F 17/32 463/42 |
| 2009/0044686 A1* | 2/2009 | Vasa | ....................... | G06F 16/68 84/609 |
| 2009/0099919 A1* | 4/2009 | Schultheiss | ........... | G06Q 10/00 705/14.1 |
| 2009/0192637 A1* | 7/2009 | Picunko | .............. | H04H 20/103 700/94 |
| 2009/0258700 A1* | 10/2009 | Bright | ..................... | A63F 13/10 463/31 |
| 2010/0273553 A1* | 10/2010 | Zalewski | ............ | H04N 21/235 463/31 |
| 2010/0304860 A1 | 12/2010 | Gault et al. | | |
| 2011/0028215 A1* | 2/2011 | Herr | ....................... | G10L 19/00 463/35 |
| 2011/0125784 A1* | 5/2011 | Cocheu | .................. | G06Q 10/10 707/769 |
| 2011/0237318 A1* | 9/2011 | Sama | .................. | G07F 17/3225 463/9 |
| 2011/0246202 A1* | 10/2011 | McMillan | ............. | G10L 19/018 715/727 |
| 2011/0320019 A1* | 12/2011 | Lanciani | ................ | G06F 16/26 707/776 |
| 2012/0122552 A1* | 5/2012 | Youm | ..................... | A63F 13/77 463/23 |
| 2013/0031162 A1* | 1/2013 | Willis | ................. | H04L 65/1069 709/203 |
| 2013/0123019 A1* | 5/2013 | Sullivan | ................ | A63F 13/424 463/42 |
| 2013/0252729 A1* | 9/2013 | Wells | ...................... | A63F 13/00 463/31 |
| 2014/0095320 A1* | 4/2014 | Sivaramakrishnan | ...................... | G06F 21/316 705/14.66 |
| 2014/0201205 A1* | 7/2014 | Makofsky | ......... | G06F 17/30867 707/736 |
| 2014/0373036 A1* | 12/2014 | Phillips | ............ | H04N 21/42203 725/12 |
| 2015/0100324 A1* | 4/2015 | Oswal | ..................... | G06F 3/165 704/500 |
| 2016/0182971 A1* | 6/2016 | Ortiz | .................. | H04N 21/8133 725/34 |
| 2017/0054961 A1* | 2/2017 | Belavy | ............... | H04N 21/8133 |
| 2017/0094410 A1* | 3/2017 | Lin | ....................... | G05B 19/04 |
| 2018/0004714 A1* | 1/2018 | Munoz | ................ | G06F 17/2235 |
| 2018/0097905 A1* | 4/2018 | Todasco | ............. | H04L 67/2842 |

* cited by examiner

IDENTIFYING MEDIA CONTENT FOR SIMULTANEOUS PLAYBACK

CROSS-REFERENCE TO RELATED APPLICATIONS

This application claims the benefit of U.S. Provisional Application No. 62/408,692, entitled "Identifying Media Content for Simultaneous Playback," filed Oct. 14, 2016, which is hereby incorporated by reference in its entirety.

BACKGROUND

Many people enjoy consuming media content, such as listening to audio content or watching video content. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her media-playback device.

This nearly limitless access to media content introduces new challenges for users. For example, it may be difficult to find or select the right media content that complements other types of content that is being consumed simultaneously, such as a video game that the user is playing.

SUMMARY

In general terms, this disclosure is directed to identifying media content for playback simultaneously with other content. In one possible configuration and by non-limiting example, a media-delivery system identifies media content items to playback while a video game is being played. Various aspects are described in this disclosure, which include, but are not limited to, the following aspects.

An aspect is a method of providing media content to a media-playback device for playback with simultaneous media content, the method comprising: receiving at a computing device a request for media content from a media-playback device, the request including an identification of simultaneous content to be played on the media-playback device; extracting the identification of the simultaneous content from the request using the computing device; identifying media content based on the extracted identification of the simultaneous content; and transmitting data relating to the media content to the media-playback device.

Another aspect is a media-delivery system comprising: a processing device; a media data store for storing a plurality of media content items; and a content identification engine executable by the processor to: receive a request for media content from a media-playback device, the request including an identification of simultaneous content to be played on the media-playback device; extract the identification of the simultaneous content from the request; identify media content based on the extracted identification of the simultaneous content; and transmit data relating to the media content to the media-playback device.

Yet another aspect is at least one non-transitory computer readable storage device storing data instructions that, when executed by at least one processing device, cause the at least one processing device to: receive a request for media content from a media-playback device, the request including an identification of simultaneous content to be played on the media-playback device; extract the identification of the simultaneous content from the request; identify media content based on the extracted identification of the simultaneous content; and transmit data relating to the media content to the media-playback device.

One more aspect is a method of playing back media content, the method comprising: generating and sending from a media-playback device to a remote computing device a request for media content, the request including an identification of simultaneous content to be played on the media-playback device, wherein the request causes the remote computing device to extract the identification of the simultaneous content from the request and to identify media content based on the extracted identification of the simultaneous content; and receiving data relating to the media content from the remote computing device.

Yet one more aspect is a media-playback device comprising: a processing device; a video adapter configured to drive a display device; an audio adapter configured to drive a sound system; and a communication device configured to communication with a remote computing device; and a computer readable storage device storing data instructions which, when executed by the processing device cause the processing device to: generate and send a request for media content using the communication device to a remote computing device, the request including an identification of simultaneous content to be played on the media-playback device, wherein the request causes the remote computing device to extract the identification of the simultaneous content from the request and to identify media content based on the extracted identification of the simultaneous content; and receiving data relating to the media content from the remote computing device.

An additional aspect is at least one non-transitory computer readable storage device storing data instructions that, when executed by at least one processing device, cause the at least one processing device to: generate and send a request for media content to a remote computing device, the request including an identification of simultaneous content to be played on the media-playback device, wherein the request causes the remote computing device to extract the identification of the simultaneous content from the request and to identify media content based on the extracted identification of the simultaneous content; and receiving data relating to the media content from the remote computing device.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume multiple types of media content simultaneously. For example, a user may listen to music simultaneously with playing a video game. Consuming media content may include one or more of listening to audio content, watching video content, watching/playing video game content, listening to or reading books, magazines, articles, etc. or consuming other types of media content. For ease of explanation, the embodiments described in this application are presented using specific examples. For example, listening to audio content (and in particular music) simultaneously with playing a video game is described as an example of one form of simultaneous media consumption. However, it should be understood that the same concepts described herein are equally applicable to other forms of media consumption, and at least some embodiments include other forms of media consumption.

In an example, a video game system presents video game content to a user. The video game system also includes a menu that includes an option to play music to accompany the video game. When the play music option is selected, the menu then presents a selection of songs, playlists, albums, artists, etc. that is specifically identified to accompany the current video game content. In some embodiments, the identified music is presented as a list, a set of shelves with the music organized by various criteria (e.g., genre), or in other presentation formats.

When a particular element of the identified music is activated (e.g., selected by a user), the video game system will then initiate playback of the identified music. In some embodiments, the identified music may be mixed (i.e., played simultaneously) with any audio content, including music, that is included in the video game content. Alternatively or additionally, the identified music replaces some or all of the audio content of the video game (e.g., music from the video game may be replaced while sound effects from the video game are retained and played over the selected music).

Although alternatives are possible, the music can be identified by and retrieved from a network-based streaming service. The video game system communicates with the network-based streaming service via an application program interface (API). For example, the video game system calls an API provided by the streaming service to request music content items and provides a signal parameter that identifies a video game. After receiving the request, the streaming service identifies music based on the signal parameter that identifies the video game. The streaming service then returns the identified music content to the video game system for presentation to the user. Although alternatives are possible, the streaming service can return the identified content as a view containing user interface elements for presenting the identified music content.

A view presents a choice of multiple media content items and offers the user of the video game system to play one. The view can present Songs, Albums, Playlists and Artists. The views depend on signals that indicate the internal state of the video game system. The signals are used by the media-delivery system to prepare views tailored to the particular state of the external media-payback device (e.g., video game system). One such use case is the game currently being played on the video game system. Another use case is the name of the speaker. A speaker named "Bedroom" can trigger a different view of playlists than the speaker named "Living room." These use cases can be combined as well.

A "view" is a set of mixed-type content data designed to be rendered according to the hints and structure contained in the API response. Its primary purpose is to provide enough information in a single call to render a complete client view containing multiple related media content items or playlists and navigational items. Views can be nested within other views, providing structural hierarchy and context for the items contained.

The request can include other parameters and other signal parameters from the video game system. In this case, some or all of the signal parameters and other parameters are used to identify music content to return to the game system. For example, the video game system can provide a signal parameter that identifies a name associated with the speaker that is being used for playback (e.g., to potentially indicate the location of the speaker). Other signal parameters are specific to the specified game and are used to indicate an aspect of the gameplay (e.g., the level the player is on, the character the player has selected to use, the number of players). Other parameters can include, for example, a time of day and a geographical region. Some or all of these parameters are then used to identify the music content that is returned to the video game system. Example request parameters are shown and described in TABLE I, below.

TABLE I

Example request parameters

| Parameter | Description |
|---|---|
| id | This parameter indicates the view name to fetch |
| country | (Optional) This parameter can indicate a country to which the returned items should be relevant. If omitted, the returned items will be relevant to all countries. The parameter can be specified in an ISO 3166-1 alpha-2 country code format. |
| locale | (Optional) This parameter indicates the desired language. This parameter can be provided to return results in a particular language, if available. If a particular locale is not supplied, or if the specified language is not available, the strings may be returned in a default language (e.g., American English). This parameter can be formatted as a lowercase ISO 639 language code and an uppercase ISO 3166-1 alpha-2 country code joined by an underscore. For example: es_MX, meaning "Spanish (Mexico)". The locale parameter can be related to the country parameter. For example, specifying "country=SE&locale=de_DE" can return a list of categories relevant to Sweden but as German language strings. |
| timestamp | (Optional) This parameter can be used to specify the user's local time to get results tailored for that specific date and time in the day. If not provided, the response defaults to the current UTC time. The parameter can be formatted as a timestamp in ISO 8601 format (e.g., yyyyMMddTHH:mm:ss). |

TABLE I-continued

Example request parameters

| Parameter | Description |
| --- | --- |
| limit | (Optional) This parameter can be used to provide a maximum number of top-level items to return. A default may be 5. In some examples, there may be maximum (e.g., 50) or minimum (e.g., 1) possible values. |
| offset | (Optional) This parameter can be used to provide the index of the first item to return. A default may be 0 (e.g., when the first object is indexed from zero). This parameter can be used with the "limit" parameter to get a next set of items. |
| content_limit | (Optional) This parameter can be used to specify the number of items to fetch per row if the view contains other views. A default may be 5. In some examples, there may be minimum (e.g., 1) and maximum (e.g., 20) possible values. |
| signal | (Optional) This parameter can be used to provide context and multiple parameters can be passed. Signals can include, for example, a game title or speaker name. There can be a separate key and value with URL encoded when passed as parameter. For example: &signal=ps4-game:347672637&signal=running-pace:10 |
| platform | (Optional) This parameter can be used to provide a platform to provide a more tailored view. |
| types | (Optional) This parameter can be used to provide a list of types to specify which types of content to return, such as tracks, albums, playlists, artists, shows, and/or episodes. A value default may be: tracks, albums, playlists, and artists. |

Although alternatives are possible, the API of the streaming service is a web API accessed through accessing a specific uniform resource locator (URL) using a hypertext transfer protocol (HTTP) or HTTP secure (HTTPS) request. The streaming service includes a web server that listens for and processes HTTP/HTTPS requests. The video game system formats requests according to the API and transports the requests using HTTP/HTTP.

The signal parameters and other parameters are included in the request as path parameters or request parameters. An example HTTPS request follows:

https://api.spotify.com/v1/views/gaming-quickmenu-staging?platform=playstation&signal=game:SPORTS2016

In this example, a request is made (e.g., by the video game system) for a view called "gaming-quickmenu-staging." The request includes a platform parameter and a signal parameter. The platform parameter specifies that the platform the request is "playstation" and the signal request includes a "game" key that is set to the value "SPORTS2016." In this example, the value is a textual representation of the name of a hypothetical game. However, in other embodiments, a numerical identifier is provided instead of or in addition to the textual representation of the name. These are just example parameters and various requests may include more, fewer, or different parameters. Typically, the API will accept multiple key-value pairs for the signal parameter. Additionally, some embodiments may use different names for the parameters or keys in the key-value pairs.

Although alternatives are possible, the request is often sent with an HTTP header that includes an access token that identifies a session that has been established between the video game system and the streaming service. In an example, the access token can be associated with a valid user or a client credential access token if no user is logged in. The session is typically associated with a user who has an account with the streaming service. The streaming service can then use information associated with the user to determine how to respond to the request. For example, the streaming service can return a list of music content items that are relevant to the specified game signal and are likely to be enjoyed by the user associated with the session (e.g., the user has previously expressly indicated liking the music content item to the streaming service, the user has played the music content item multiple times, the user has expressly indicated or played multiple times other music content items by the same artist, the user has expressly indicated or played multiple times other music content items that have similar acoustic or other qualities).

One or both of the video game system and the streaming service can analyze the signal parameters and other parameters that are included with the request to identify patterns. These identified patterns can be used to predict future user behavior and present appropriate content. For example, a pattern can be recognized that the user typically plays a particular game every Friday evening. Additionally, one or both of the video game system and the streaming service can analyze which of the identified music content items are selected by the user for playback and/or are skipped once playback is initiated. This analysis can be used to improve the identification of music content items in response to future requests (e.g., to avoid items that are frequently skipped and to favor items that are frequently selected for playback). In some embodiments of the streaming service, data analysis from multiple users is aggregated to modify/update the model used to select music content items.

The streaming service returns a response to the video game system. The response includes the list of the music content items that were identified based on the game signal property and other factors. In various embodiments, the response is formatted in various ways. For example, the response is encoded using JavaScript object notation (JSON) in some embodiments. Alternatively, the response is encoded in a markup language such as hypertext markup language (HTML), extensible markup language (XML), or another markup language.

In some embodiments, the response includes only a list of music content items (or other types of media content items) or playlists containing music content items. For example, the list may include an identifier for each of the music content items or playlists. The identifier can be a numeric identifier, an alphanumeric identifier, a URL, or another type of identifier.

In other embodiments, the response includes a list of music content items or playlists (or other types of media content items) and other information. For example, the response can include one or more views that define, in whole or in part, how the music content items or playlists are to be presented in a user interface. In an example, the views include text and or an image to display for each of the items in the list. The views can also include sub-views that are usable to organize the items that are returned in a user interface. For example, the sub-views may group the list items by genre, era, artist, playlist source (curator), and other factors.

A response can include a variety of keys-value pairs describing a view, including but not limited to those described in TABLE II, below.

TABLE II

Example key-value pairs for a view

| Key | Value Type | Value Description |
| --- | --- | --- |
| content | an array of objects inside a paging object | This value can be a paging object containing an array of permitted item types. It can contain other view objects, such as album objects, playlist objects, artist objects, or link objects. The type field in these objects can be used to determine what type they are. |
| external_urls | string | This value is an external URL object |
| href | string | This value is a link to this resource in the Web API |
| id | string | This value is the view ID |
| images | an array of image objects | This value is an array of image objects with an extra name field added. |
| name | string | This value is the name of the view. It can be translated/localized, if available. |
| rendering | string | This value is a rendering hint that suggests how items in the view should be rendered. Some of the possible values are: default, stack, list, banner, grid, and carousel. |
| tagline | string | This value is the descriptive message of this view (can be null) and can be translated/localized if available. |
| type | string | This value is the object type (e.g., view) |

Example parameters for a link object (e.g., as described above as a potential value for the key "content" can include one or more parameters as shown and described in TABLE III, below.

TABLE III

Example key-value pairs for a link object

| Key | Value Type | Value Description |
| --- | --- | --- |
| href | string | This value is an href for the target of the link. It can be a link to a Web API resource or an external URL. |
| images | an array of image objects with an extra name field added | This value is an array of image objects with an extra name field added. |
| name | string | This value is the name of the link, and can be translated/localized if available. |
| type | string | This value is the object type (e.g., "link"). |

An example portion of an example response describing a view is shown in TABLE IV, below.

TABLE IV

Example response

```
...
"content": {
  "href": "<URL0>",
  "items": [{
    "external_urls": null,
    "href": null,
    "id": "recentlyplayedplaceholder",
    "images": [ ],
    "name": "recentlyplayedplaceholder",
    "rendering": "BANNER",
    "tag_line": null,
    "type": "view"
    "content": {
```

TABLE IV-continued

Example response

```
    "href": null,
    "items": [{
      "name": "Today's Top Hits",
      "type": "playlist",
      "uri": "spotify:user:spotify:playlist<ID>"
      "tracks": {
        "href": "<URL2>/playlists/<ID>/tracks",
        "total": 50},
      "external_urls": {"spotify": "<URL1>/playlist/<ID>"},
      "href": "<URL2>/playlists/<ID>",
      "id": "<ID>",
      "images": [{
        "url": "<Image URL>",
        "width": null
        "height": null, }],
      "owner": {
        "external_urls": {"spotify": "<URL1>"},
        "href": "<URL2>",
        "id": "spotify",
        "type": "user",
        "uri": "spotify:user:spotify"},
      "public": null,
      "snapshot_id": "<ID>",
      "collaborative": false, }],
    "limit": 2,
    "next": null,
    "offset": 0,
    "previous": null,
```

TABLE IV-continued

Example response

```
    "total": 1
  },
...
```

Figure 1:
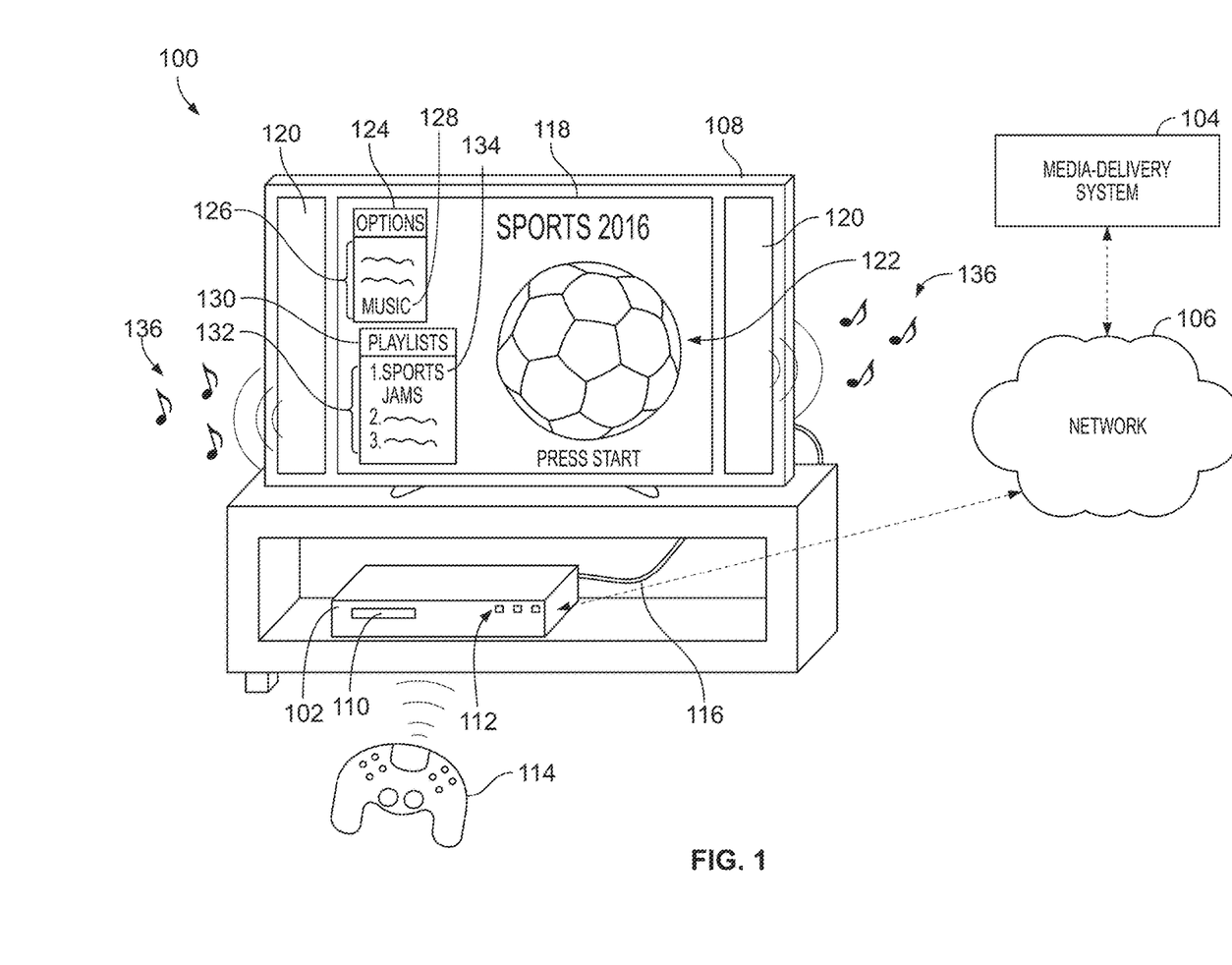
FIG. 1 is an example system for playing video games and identifying content items.

FIG. 1 illustrates an example system 100 for identifying media content for simultaneous playback. The example system 100 includes a media-playback device 102 and a media-delivery system 104. The system 100 communicates across a network 106.

The media-playback device 102 operates to play media content items to produce media output. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

A streaming service is an example of the media delivery system 104. A video game system is an example of the media-playback device 102. A music content item is an example of a media content item.

The media-playback device 102 presents multiple types of media content to the user simultaneously. For example, the media-playback device 102 can be a video game system that presents music content items to a user based on a game that is currently being played. In some embodiments, the media playback device 102 includes a content port 110, controls 112, controller 114, and transmission line 116.

The content port 110 is configured to receive a tangible media storage device that contains content, such as game content. In some examples, the content port 110 is configured to receive a game cartridge, a compact disc (CD), a digital versatile disc (DVD), or a BLU-RAY DISC. The media-playback device 102 may determine the currently playing content based on a tangible media storage device inserted in the content port 110. Additionally or alternatively, the media-playback device 102 includes a non-transitory internal storage device that stores content for later playback. The media-playback device 102 may receive download and store content for later playback from external computing devices via the network. For example, the media-playback device 102 may download game content from a content delivery platform such as the STEAM® platform from Valve Corporation of Bellevue, Wash. In these embodiments, currently playing content may be stored on either a tangible media storage device inserted in the content port 110 or on the non-transitory internal storage device.

The controls 112 are physical controls that are usable to trigger actions on the media-playback device 102 such as turning the media-playback device on or off, or resetting the media-playback device 102. Some embodiments include different, fewer, or additional controls.

The controller 114 receives input from a user and transmits the input to the media-playback device 102. In some embodiments, the controller 114 also receives data from the media-playback device 102 and displays that data on a screen of the controller 114. In various embodiments, the controller 114 includes one or more joysticks and one or more buttons. Although alternatives are possible, the controller 114 communicates with the media-playback device 102 wirelessly. Often, the media-playback device 102 includes multiple controllers.

The transmission line 116 transmits signals such as audio and video signals for output on an external device such as the television 108. The television 108 includes a screen 118 and speaker assembly 120. Although FIG. 1 includes a television 108, alternatives are possible. For example, some embodiments of the media-playback device 102 include one or more screens and one or more speakers. Additionally, the media-playback device 102 can be connected to one or more display devices such as monitors, projectors, or other types of display devices.

In this example, the screen 118 is displaying game content 122 and the speaker assembly 120 is playing back music content 136. The screen is also displaying an "OPTIONS" menu 124. In some embodiments, the options menu 124 is accessed from a setup screen or by pressing a particular button (or combination of buttons) on the media-playback device 102 or controller 114. The options menu 124 includes a list 126 of options that provide various functions the user can activate. One of the options in the list 126 is a "MUSIC" option 128. When activated, the music option 128 displays media content items (or playlists of media content items) that have been identified for simultaneous playback with the currently active video game content. In this example, a view 130 showing the identified content is shown. The view 130 includes a list 132 of playlists containing media content items.

In this example, the currently active game content is called "SPORTS 2016" and the list 132 includes a playlist 134 titled "Sports Jams." As described previously, the title of the currently active game content may be sent to the media delivery system 104 as a signal parameter in a HTTP request. The media delivery system 104 then identifies media content item based on the signal parameter and responds with information about the identified content. That information is used to generate the view 130 shown on the user interface displayed on the screen 118.

The media delivery system 104 can use various techniques to identify media content items to include in response to a particular signal. For example, the media delivery system can identify playlists or individual media content items that are associated with the name (or another identifier) of the game. The association may be based on a record stored in a relational database or another type of file. In some examples, the association is based on user or administrator tagging the playlist or media content item for the game. Alternatively or additionally, the playlists or media content items are identified based on analysis of previous content users have selected for playback with the game. In another method, content or playlists that have a word in common with the game name or related to the game name are selected. For example, playlists with the word SPORTS or a related word (e.g., football, soccer, baseball, etc.) may be selected. Content or playlists may also be selected based on acoustic properties that fit a genre of the game (e.g., a first person shooter game may be associated with high energy music, a puzzle game may be associated with music that promotes concentration).

As used herein acoustic properties means various qualities of a media content item that can measured directly or indirectly. While media content may be composed of various qualities that can be directly measured (e.g., tempo, onsets, durations, pitches, etc.), the media content also includes various indirect qualities. An indirect quality may be a quality that cannot be directly measured from the media content (e.g., not detectable from the structure of music in the media content item, its score representation, or its transcription). For example, some media content may induce a particular emotional response in a person listening to or watching the media content. Typically, whether a media content item will induce a particular emotional response cannot be measured directly from data representing the media content (e.g., audio signal, video signal, etc.). Additionally, indirect qualities may lack a unit of measurement. In contrast, many qualities that can be measured directly are associated with units of measurement (e.g., seconds for duration, hertz for pitch, beats per minute for tempo, etc.).

Indirect qualities may be subjective or objective. Examples of subjective qualities include the intensity or energy of a media content item, the valence or positiveness conveyed by the media content item, and the suitability of a media content item for an activity such as playing a video game, dancing, or running. Other indirect qualities, however, are reasonably objective. Examples of objective indirect qualities includes whether a media content item was recorded live, whether it was exclusively recorded with acoustic instruments, whether it is exclusively instrumental; whether the vocals are spoken words. Together with subjective attributes, they share the quality of being acoustically predictable.

Although indirect qualities may not be directly measurable and in some cases may be subjective, the indirect qualities may nevertheless be perceived fairly consistently by different people. In some embodiments, a system predicts at least one indirect quality for a media content item from data such as an audio or video recording. Predicting an indirect quality may include generating a score corresponding to the likelihood that the media content item associated with the score would be perceived as having the indirect quality by a listener, viewer, etc. The score may be a numeric value or a Boolean value. The predictions may be generated using a model derived from supervised learning techniques.

Some non-limiting examples of indirect qualities include danceability, energy, speechiness, liveness, acousticness, valence, and instrumentalness. In some embodiments, a danceability score describes how suitable a media content item is for dancing. In some embodiments, the danceability score is based on a combination of some or all of the following: tempo, rhythm stability, beat strength, and overall regularity.

In some embodiments, an energy score represents a perceptual measure of intensity and powerful activity released throughout the media content item. In some embodiments, media content items that have a high energy score are perceived as fast, loud, and noisy. For example, music from the genre death metal may have a higher energy score, while a Bach prelude has a lower energy score. In some embodiments, the energy score is based on a combination of some or all of the following: dynamic range, perceived loudness, timbre, onset rate, and general entropy.

In some embodiments, a speechiness score represents the presence of spoken words in a track. The more exclusively speech-like the media content item (e.g. talk show, audio book, poetry), the higher the speechiness score. Some embodiments use a range of scores between 0.0 and 1.0 for speechiness, where values above 0.66 describe media content items that are probably made entirely of spoken words, values between 0.33 and 0.66 describe media content items that may contain both music and speech (either in sections or layered, including, e.g., rap music), and values below 0.33 most likely represent music and other nonspeech-like media content items.

In some embodiments, a liveness score represents the presence of an audience in the media content item. The more likely a media content item is live, the higher the liveness score. Some embodiments use a range of scores between 0.0 and 1.0 for liveness, where a score above 0.8 indicates the media content item is highly likely to include a live recording, values between 0.6 and 0.8 represent media content items that may include live or simulated audience sounds (e.g., at the beginning or end of the media content item), and values below 0.6 most likely represent studio recordings. Because some embodiments include a relatively small population of live media content items in the overall domain of media content items, the threshold for determining that a media content item is live may be higher than the thresholds for other indirect qualities.

In some embodiments, an acousticness score represents the likelihood a media content item includes a recording that was created by solely acoustic means such as voice and acoustic instruments as opposed to electronically such as with synthesized, amplified, or effected instruments. For example, media content items with lower acousticness scores may include electric guitars, distortion, synthesizers, auto-tuned vocals, and drum machines, whereas songs with higher acousticness scores may include orchestral instruments, acoustic guitars, unaltered voices, and natural drum kits.

In some embodiments, a valence score represents the musical positivity conveyed by a media content item. Media content items with higher valence scores may be perceived as more positive (e.g., happy, cheerful, euphoric), while tracks with lower valence scores may be perceived as more negative (e.g., sad, depressed, angry). In some embodiments, the valence score is evaluated in combination with the energy score to indicate an acoustic mood of the media content item (e.g., the general emotional qualities that are likely to be perceived during playback of the media content item). Note that in the case of vocal music, lyrics may differ semantically from the perceived acoustic mood as indicated by one or more of the valence score and the energy score.

In some embodiments, the instrumentalness score represent the likelihood a media content item contains only recordings of instruments (e.g., no vocal recordings). Media content items featuring the human voice, more particularly lyrics, even with instruments, will have a lower instrumentalness score. In contrast, media content items with only instruments may have a higher instrumentalness score.

Figure 2:
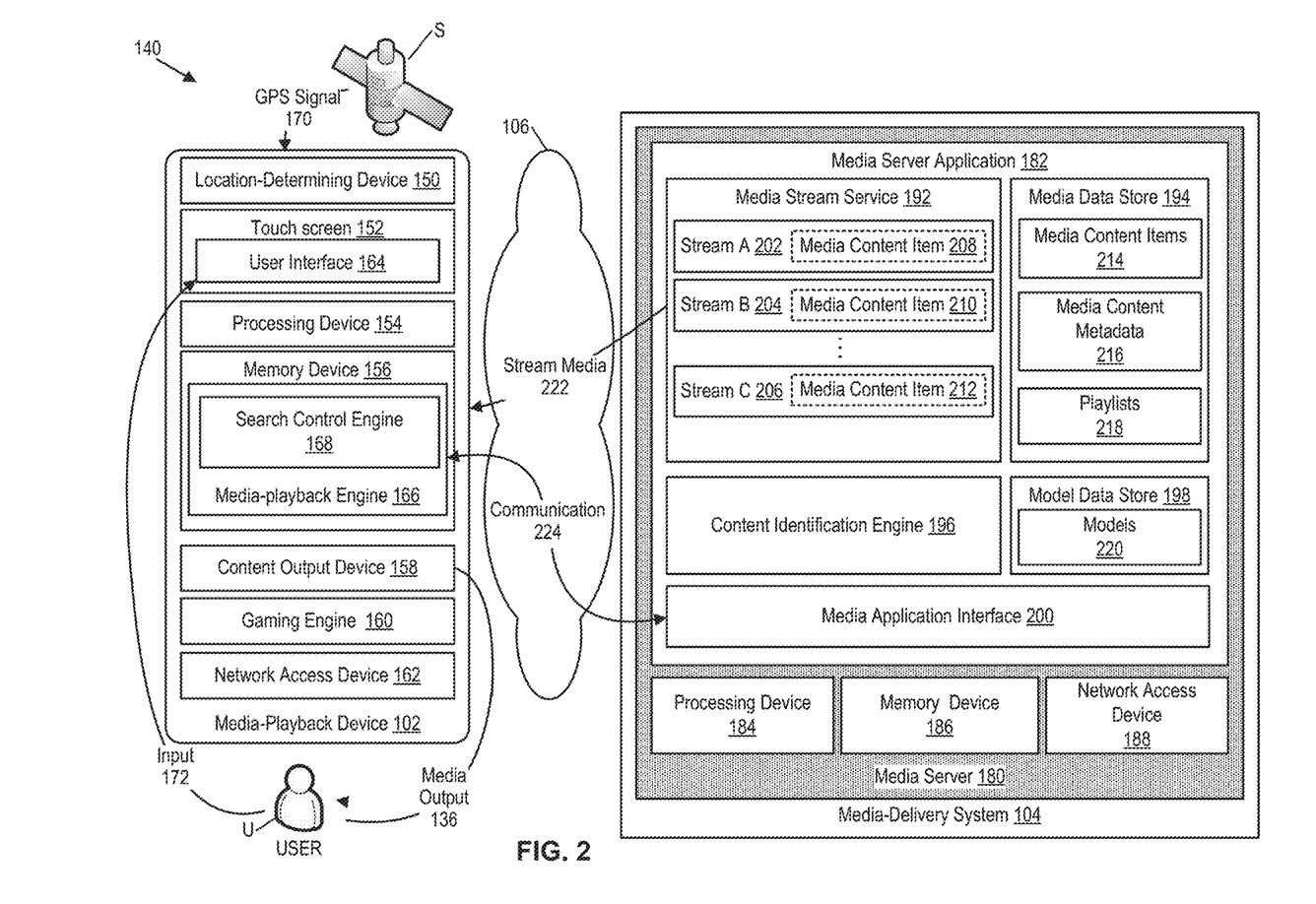
FIG. 2 is a schematic illustration of an example system for identifying media content for simultaneous playback.

FIG. 2 is a schematic illustration of an example system 140 for media content selection. The system 140 includes the media-playback device 102 and the media-delivery system 104. Also shown in FIG. 2, are the network 106, a user U, and a satellite S.

The media-playback device 102 operates to play media content items. In some embodiments, the media-playback device 102 operates to play media content items that are provided (e.g., streamed, transmitted, etc.) by a system external to the media-playback device 102 such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by a system external to the media-playback device 102.

The media-playback device 102 operates to play media content items to produce media output 136. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, BLU-RAY DISC player, DVD player, media player, stereo, or radio.

In at least some embodiments, the media-playback device 102 includes a location-determining device 150, a touch screen 152, a processing device 154, a memory device 156, a content output device 158, a gaming engine 160, and a network access device 162. Other embodiments may include additional, different, or fewer components. For example, some embodiments may include movement-acquiring device and/or a recording device such as a microphone or camera that operates to record audio or video content. As another example, some embodiments do not include one or more of the location-determining device 150, the touch screen 152, and the gaming engine 160.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices (e.g., controller 114). Further, some embodiments do not include a display device.

In some embodiments, the processing device 154 comprises at least one central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a search control engine 168. In some embodiments, the media-playback engine 166 operates to playback media content and the search control engine 168 operates to identify or retrieve media content for playback based on various conditions. Additional details regarding the search control engine 168 are provided below.

The memory device 156 typically includes at least some form of computer-readable media. Computer-readable media includes any available media that can be accessed by the media-playback device 102. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, BLU-RAY discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, the computer-readable storage media comprises non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The content output device 158 operates to output media content. In some embodiments, the content output device 158 generates media output 136 for the user U. Examples of the content output device 158 include a speaker, an audio output jack, a BLUETOOTH transmitter, a display panel, and a video output jack. Other embodiments are possible as well. For example, the content output device 158 may transmit a signal through the audio output jack or BLUETOOTH transmitter that can be used to reproduce an audio signal by a connected or paired device such as headphones or a speaker.

The gaming engine 160 performs gaming operations to provide game content for a user. The gaming operations may include receiving user input to control game play and generating graphical and audio output for the game. The gaming engine 160 may run a stored program that defines the game. The gaming content may also communicate over the network 106 to provide networked gaming operations and/or multiplayer game play.

Optionally, a movement-acquiring device operates to acquire movement data associated with movements of the user U. Examples of movement data include a direction of the movement, an intensity of the movement, a cadence (e.g., frequency) of the movement, and a regularity of the movement. In at least some embodiments, the movement-acquiring device operates to determine movement directly and includes one or more accelerometers or other motion-detecting technologies. Alternatively, the movement-acquiring device operates to receive data representing a movement associated with the user U. For example, in some embodiments, the movement-acquiring device operates to receive data from a watch, bracelet, foot pod, chest strap, shoe insert, anklet, smart sock, bicycle computer, exercise equipment (e.g., treadmill, rowing machine, stationary cycle), or other device for determining or measuring movement. Further, in some embodiments, the movement-acquiring device operates to receive movement data input by the user U or another person such as through a user interface or user-actuatable control.

The network access device 162 operates to communicate with other computing devices over one or more networks, such as the network 106. Examples of the network access device include wired network interfaces and wireless network interfaces. Wireless network interfaces includes infrared, BLUETOOTH wireless technology, 802.11a/b/g/n/ac, and cellular or other radio frequency interfaces in at least some possible embodiments.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including BLUETOOTH, ultra-wideband (UWB), 802.11/b/g/n/ac, ZIGBEE, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180. In at least some embodiments, the media server 180 is provided by multiple computing devices. For example, the media server 180 may be provided by multiple redundant servers located in multiple geographic locations. As an additional example, the various functions of the media server 180 may be provided by multiple heterogeneous servers.

The media server 180 operates to transmit stream media 222 to media-playback devices such as the media-playback device 102. In some embodiments, the media server 180 includes a media server application 182, a processing device 184, a memory device 186, and a network access device 188. The processing device 184, the memory device 186, and the network access device 188 may be similar to the processing device 154, the memory device 156, and the network access device 162 respectively, which have each been previously described.

In some embodiments, the media server application 182 operates to stream music or other audio, video, or other forms of media content. The media server application 182 includes a media stream service 192, a media data store 194, a content identification engine 196, a model data store 198, and a media application interface 200.

In some embodiments, multiple servers provide various components of the media server application 182. For example, in some embodiments, separate heterogeneous servers operate to provide each of the media stream service 192, the media data store 194, the content identification engine 196, the model data store 198, and the media application interface 200.

The media stream service 192 operates to buffer media content such as media content items 208, 210, and 212 for streaming to one or more streams 202, 204, and 206.

In some embodiments, the media data store 194 stores media content items 214, media content metadata 216, and playlists 218. The media data store 194 may comprise one or more databases and file systems. Other embodiments are possible as well. As noted above, the media content items 214 may be audio, video, or any other type of media content, which may be stored in any format for storing media content.

The media content metadata 216 operates to provide various information associated with the media content items 214. In some embodiments, the media content metadata 216 includes one or more of title, artist name, album name, length, genre, mood, era, etc. The playlists 218 operate to identify one or more of the media content items 214 and. In some embodiments, the playlists 218 identify a group of the media content items 214 in a particular order. In other embodiments, the playlists 218 merely identify a group of the media content items 214 without specifying a particular order. Some, but not necessarily all, of the media content items 214 included in a particular one of the playlists 218 are associated with a common characteristic such as a common genre, mood, or era.

The content identification engine 196 operates to identify media content items that based on signal properties and other properties provided in requests from the media-playback devices such as the media-playback device 102. In some embodiments, the content identification engine 196 may provide a list of media content items that have been identified in response to a request that identifies simultaneous content (e.g., game content) that is being output by the media-playback device 102. Further, in some embodiments, the media content items included in the returned list are further identified based on additional attributes such as genre, tempo, known or specified user preferences, etc.

In some embodiments, the model data store 198 stores models 220 that are usable by the content identification engine 196. In some embodiments, the models 220 are generated by the content identification engine 196. Additionally, in some embodiments, the models 220 may be generated elsewhere and are transmitted to the media-delivery system 104 for storage in the model data store 198 and use by the content identification engine 196. The model data store 198 may comprise one or more databases and file systems. Other embodiments are possible as well. Additionally, in some embodiments, the models 220 are stored in the media data store 194.

The media application interface 200 can receive requests or other communication from media-playback devices or other systems, to retrieve media content items from the media server 180. For example, in FIG. 2, the media application interface 200 receives communication 224 from the media-playback engine 166. For example, the media application interface may implement an API such as the API described in Appendix A.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for identifying content for simultaneous playback, other embodiments are possible as well. For example, in some embodiments, the media-playback device 102 includes a media data store 194 and the media-playback device 102 is configured to perform media content selection without accessing the media-delivery system 104. Further, in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a request from the user U to retrieve or playback media content items that are identified for a specified simultaneous content. In accordance with an embodiment, the user U can direct the input 172 to the user interface 164 to issue such requests.

Figure 3:
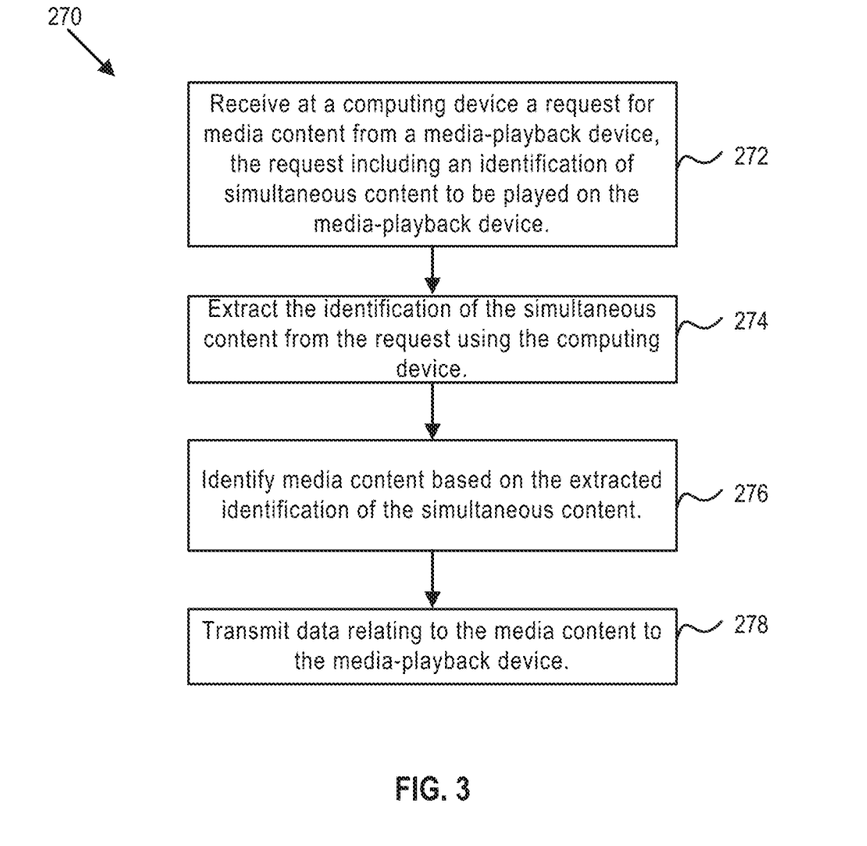
FIG. 3 is a flowchart of an example method identifying media content for simultaneous playback.

FIG. 3 illustrates an example method 270 of identifying media content for simultaneous playback. Such a method can be used, for example, when the user is playing a particular game on the media-playback device and desires to hear music that fits well with the game. For example, this method may be performed by the media-delivery system 104 in response to a request from the media-playback device 102.

At operation 272, a computing device receives a request for media content from a media-playback device. The request includes an identification of simultaneous content to be played (or that is playing) on the media-playback device. At operation 274, the identification of the simultaneous content is extracted from the request using the computing device. At operation 276, media content is identified based on the extracted identification of the simultaneous content. At operation 278, data relating to the media content is transmitted to the media-playback device.

Although the method 270 has been described sequentially, in some embodiments the operations of method 270 are performed in different orders or include different operations. Additionally, in some embodiments, the operations of method 270 may be performed at different times or repeated independent of each other.

Example Embodiments

Embodiments of the present disclosure described herein include the following and combinations thereof:

In a first example, there is a method of providing media content to a media-playback device for playback with simultaneous media content. The method includes: receiving at a computing device a request for media content from a media-playback device, the request including an identification of simultaneous content to be played on the media-playback device; extracting the identification of the simultaneous content from the request using the computing device; identifying media content based on the extracted identification of the simultaneous content; and transmitting data relating to the identified media content to the media-playback device.

In a second example, which continues first example, the request for media content includes an application program interface (API) call.

In a third example, which continues the second example, the identification of the simultaneous content is encoded as a signal parameter within the API call.

In a fourth example, which continues the first example, the computing device is a server computing device of a network-based streaming service.

In a fifth example, which continues the first example, the request is received in accordance with a hypertext transfer protocol.

In a sixth example, which continues the first example, the media-playback device is a video game system In a seventh example, which continues the first example, the simultaneous content is a video game.

In an eighth example, which continues the seventh example, the identification of the simultaneous content comprises a name of the video game.

In a ninth example, which continues the first example, extracting the identification comprises extracting a signal parameter from an application programming interface call.

In a tenth example, which continues the first example, identifying media content comprises conducting a search for the media content items using the identification of the simultaneous content.

In an eleventh example, which continues the first example, identifying the media content further comprises identifying media content items that are tagged with the identification of the simultaneous content.

In a twelfth example, which continues the first example, identifying the media content comprises: conducting a search for playlists containing the identification of the simultaneous content; and evaluating media content included in the playlists.

In a thirteenth example, which continues the first example, transmitting data relating to the media content comprises transmitting a list of songs.

In a fourteenth example, which continues the first example, transmitting data relating to the media content comprises streaming the identified media content.

In a fifteenth example, which continues the first example, the request further comprises at least one other signal parameter, and identifying the media content is further based on the at least one other signal parameter.

In a sixteenth example, which continues the fifteenth example, the at least one other signal parameter comprises contextual information for the playback of simultaneous content, the contextual information comprising one or more of: a time of day for the playback of simultaneous content, a location of playback of the simultaneous content, and an ambiance at the location of playback of the simultaneous content.

In a seventeenth example, a media-delivery system includes: a processing device; a media data store for storing a plurality of media content items; and a content identification engine. The content identification engine can be executable by the processor to: receive a request for media content from a media-playback device, the request including an identification of simultaneous content to be played on the media-playback device; extract the identification of the simultaneous content from the request; identify media content based on the extracted identification of the simultaneous content; and transmit data relating to the media content to the media-playback device.

In an eighteenth example, which continues the seventeenth example, the content identification engine is further executable to perform any one or more of the steps of examples 1-16.

In a nineteenth example, there is at least one non-transitory computer readable storage device storing data instructions. The data instructions, when executed by at least one processing device, cause the at least one processing device to: receive a request for media content from a media-playback device, the request including an identification of simultaneous content to be played on the media-playback device; extract the identification of the simultaneous content from the request; identify media content based on the extracted identification of the simultaneous content; and transmit data relating to the media content to the media-playback device.

In a twentieth example, which continues the nineteenth example, there are storing instructions to perform any one or more of the steps of examples 1-16.

In a twenty-first example, there is a method of playing back media content, the method comprising: generating and sending from a media-playback device to a remote computing device a request for media content, the request including an identification of simultaneous content to be played on the media-playback device, wherein the request causes the remote computing device to extract the identification of the simultaneous content from the request and to identify media content based on the extracted identification of the simultaneous content; and receiving data relating to the media content from the remote computing device.

In a twenty-second example, which continues the twenty-first example, the request for media content is an application program interface (API) call.

In a twenty-third example, which continues the method of the twenty-first example, the identification of the simultaneous content is encoded as a signal parameter within the API call.

In a twenty-fourth example, which continues the twenty-first example, the remote computing device is a server computing device of a network-based streaming service.

In a twenty-fifth example, which continues the twenty-first example, the request is sent in accordance with a hypertext transfer protocol.

In a twenty-sixth example, which continues the twenty-first example, the media-playback device is a video game system.

In a twenty-seventh example, which continues the twenty-first example, the simultaneous content is a video game.

In a twenty-eighth example, which continues the twenty-seventh example, the identification of the simultaneous content is a name of the video game playable on the media-playback device.

In a twenty-ninth example, which continues the twenty-first example, the identification is encoded in an application programming interface call as a signal parameter.

A thirtieth example, which continues the twenty-first example, includes receiving data relating to the media content comprises receiving a list of songs.

A thirty-first example, which continues the twenty-first example, includes receiving data relating to the media content comprises receiving a media content stream from the remote computing device.

In a thirty-second example, which continues the thirty-first example, the remote computing device comprises two or more server computers.

In a thirty-third example, which continues the thirty-first example, the request further comprises at least one other signal parameter.

In a thirty-fourth example, which continues the thirty-third example, the at least one other signal parameter comprises contextual information for the playback of simultaneous content, the contextual information comprising one or more of: a time of day for the playback of simultaneous content, a location of playback of the simultaneous content, and an ambiance at the location of playback of the simultaneous content.

In a thirty-fifth example, which continues the twenty-first example, the method further comprises: playing the simultaneous content using the media playback device; and playing the media content using the media playback device while the simultaneous content is playing.

In a thirty-sixth example, which continues the thirty-fifth example, the simultaneous content is a video game, and the media content is at least one song.

A thirty-seventh example, which continues the twenty-first example, includes generating a user interface displaying at least some of the data relating to the media content.

In a thirty-eighth example, which continues the thirty-seventh example, the user interface includes a menu, and the data relating to the media content includes an identification of one or more playlists, wherein the playlists are selectable by a user to select the media content for playback.

In a thirty-ninth example, which continues the thirty-seventh example, the user interface includes a list of songs.

In a fortieth example, which continues the thirty-seventh example, the user interface includes a music player interface including playback controls, the controls including at least a play button and a stop button.

In a forty-first example, a media-playback device comprises: a processing device; a video adapter configured to drive a display device; an audio adapter configured to drive a sound system; a communication device configured to communicate with a remote computing device; and a computer readable storage device storing data instructions. The instructions, when executed by the processing device cause the processing device to: generate and send a request for media content using the communication device to a remote computing device, the request including an identification of simultaneous content to be played on the media-playback device, wherein the request causes the remote computing device to extract the identification of the simultaneous content from the request and to identify media content based on the extracted identification of the simultaneous content; and receiving data relating to the media content from the remote computing device.

In a forty-second example, which continues the forty-first example, the instructions further cause the processing device to perform any one or more of the steps of examples 21-40.

In a forty-third example, there is at least one non-transitory computer readable storage device storing data instructions that, when executed by at least one processing device, cause the at least one processing device to: generate and send a request for media content to a remote computing device, the request including an identification of simultaneous content to be played on the media-playback device, wherein the request causes the remote computing device to extract the identification of the simultaneous content from the request and to identify media content based on the extracted identification of the simultaneous content; and receiving data relating to the media content from the remote computing device.

In a forty-fourth example, which continues the forty-third example, the instructions further cause the at least one processing device to perform any one or more of the steps of examples 21-40.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following disclosure.

What is claimed is:

1. A method of providing audio content to a video game system for playback with simultaneous video game content, the method comprising:
   receiving at a server computing device of a network-based streaming service a request from a remote video game system, the request comprising an application programming interface (API) call including an identification of simultaneous video game content to be played on the video game system encoded as a signal parameter, and a state of the video game system encoded as another signal parameter, wherein the API call further comprises at least two of:
   a parameter describing an aspect of gameplay of the video game content;
   a parameter including a date and time the request is sent from the remote video game system;
   a parameter including a number of audio content items to return in response; and
   a parameter including a type of audio content items to return in response;
   extracting the identification of the simultaneous video game content from the request using the server computing device;
   identifying audio content items based on the extracted identification of the simultaneous video game content, wherein the audio content items are separate from video game audio content of the simultaneous video game content;
   preparing a view dynamically tailored to the state of the video game system that includes user interface elements for presenting the identified audio content items;
   transmitting user interface data corresponding to the view to the video game system as a response to the request, wherein the user interface data is configured to provide the view as an overlay over the simultaneous video game content;
   receiving a selection of a user-selected item of the identified audio content items from the view; and
   streaming audio content to the video game system associated with the user-selected item of the identified audio content items.

2. The method of claim 1, wherein the signal parameter of the API call comprises a game name key-value pair specifying a game name identifier.

3. The method of claim 1, wherein the API call further comprises a parameter describing a platform of the video game system.

4. The method of claim 1, wherein the request is received in accordance with a hypertext transfer protocol.

5. The method of claim 1, wherein the request is associated with a user account; and wherein identifying the audio content items is further based on a playback pattern associated with the user account.

6. The method of claim 1, wherein identifying the audio content items is further based on acoustic properties associated with the simultaneous video game content.

7. The method of claim 1, wherein identifying audio content items comprises conducting a search using the identification of the simultaneous video game content.

8. The method of claim 1, wherein identifying the audio content items comprises:
   conducting a search for playlists containing the identification of the simultaneous video game content; and
   evaluating audio content included in the playlists.

9. The method of claim 1, wherein the user interface data comprises a list of songs.

10. The method of claim 1, further comprising analyzing the video game content to identify patterns for identifying appropriate audio content.

11. The method of claim 1, wherein the request further comprises at least one other signal parameter, and wherein identifying the audio content items is further based on the at least one other signal parameter.

12. The method of claim 11, wherein the at least one other signal parameter comprises contextual information comprising one or more of: a time of day, a location of playback, and an ambiance.

13. The method of claim 1, wherein the user interface request further includes an identification of an audio output device; and wherein identifying the audio content items is further based on the identification of the audio output device.

14. The method of claim 1, wherein identifying the audio content items includes conducting a search for one or more audio content items having acoustic properties suitable for the video game content.

15. The method of claim 1, wherein the request further includes a parameter indicating an aspect of gameplay of the video game content; and wherein identifying the audio content items is further based on the aspect of gameplay.

16. The method of claim 1, wherein the state of the video game system indicates whether video game content is currently being played on the video game system, and the method further comprises preparing the view tailored to the current gameplay state of the video game system.

17. The method of claim 1, wherein the state of the video game system indicates a location of a speaker of the video game system, and the method further comprises preparing the view tailored to the location of the speaker.

18. The method of claim 1, wherein transmitting the user interface data corresponding to the view to the video game system as a response to the request comprises:
   encoding the response in a markup language, the response including a plurality of key-value pairs defining the view.

19. The method of claim 18, where the identified audio content items are defined by one or more of a URL, a name, and an image in the response.

20. A media-delivery system comprising:
   a processing device;
   a media data store for storing a plurality of audio content items; and
   a content identification engine executable by the processing device to:
   receive an application programming interface (API) call for an audio content user interface from a remote video game system, the API call including a parameter specifying an identification of simultaneous video game content to be played on the video game system and another parameter specifying a state of the video game system wherein the API call further comprises at least two of:
  a parameter describing an aspect of gameplay of the video game content;
  a parameter including a date and time the request is sent from the remote video game system;
  a parameter including a number of audio content items to return in response; and
  a parameter including a type of audio content items to return in response;
extract the identification of the simultaneous video game content from the API call;
identify audio content items based on the extracted identification of the simultaneous video game content, wherein the audio content items are separate from video game audio content of the simultaneous video game content;
prepare a view dynamically tailored to the state of the video game system that includes user interface elements for presenting the identified audio content items; and
transmit user interface data corresponding to the view to the video game system as a response to the request, wherein the user interface data is configured to facilitate the video game system providing the view as an overlay over the video game content.

21. The media-delivery system of claim 20, wherein at least one of the parameters includes a game name key-value pair.

22. The media-delivery system of claim 20, wherein identifying the audio content items comprises conducting a search for the audio content items using the identification of the simultaneous video game content; and wherein identifying the audio content items further comprises identifying audio content items that are tagged with the identification of the simultaneous video game content.

23. A method of playing back media content from a video game system, the method comprising:
  providing video game content for display to a user;
  generating and sending to a remote computing device of a network-based streaming service a request for audio content, the request comprising an application programming interface (API) call including an identification of the video game content encoded as a signal parameter, and a state of the video game system encoded as another signal parameter, the application programming interface call further comprising at least two of:
    a parameter describing an aspect of gameplay of the video game content;
    a parameter including a date and time the request is sent from the remote video game system;
    a parameter including a number of audio content items to return in response; and
    a parameter including a type of audio content items to return in response; wherein the request is configured to cause the remote computing device to identify audio content based on the identification of the video game content and to prepare a view dynamically tailored to the state of the video game system, the view including user interface elements for presenting the identified audio content;
  receiving, from the network-based streaming service, user interface data corresponding to the view as a response to the request;
  generating the view using the user interface data, wherein the view displays an identification of one or more playlists from the identified audio content that are selectable for playback, wherein the generating of the view using the user interface data includes providing the view for display as an overlay over the video game content;
  initiating playback of streaming audio content associated with a user-selected playlist of the one or more playlists from the view, wherein the streaming audio content is separate from video game audio content; and
  mixing the streaming audio content with audio of the video game content for output.

24. The method of claim 23, wherein generating the view comprises rendering content data of the user interface data according to a structure within the user interface data.

25. The method of claim 23, wherein the view comprises navigational items.

26. The method of claim 23, further comprising simultaneously playing the mixed streaming audio content and the audio of the video game content.

27. The method of claim 23, further comprising:
  while providing the video game content for display to the user: receiving a selection of a menu item for playing music content to accompany the video game content, wherein the generating and sending the request for audio content is responsive to receiving the selection of the menu item.

* * * * *